(12) United States Patent
Nakada et al.

(10) Patent No.: US 8,521,416 B2
(45) Date of Patent: Aug. 27, 2013

(54) VEHICLE CONTROL APPARATUS AND VEHICLE CONTROL METHOD

(75) Inventors: Yuki Nakada, Yokohama (JP); Toshiya Oosawa, Yokohama (JP); Akira Takahashi, Isehara (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 308 days.

(21) Appl. No.: 13/043,984

(22) Filed: Mar. 9, 2011

(65) Prior Publication Data

US 2011/0231095 A1 Sep. 22, 2011

(30) Foreign Application Priority Data

Mar. 19, 2010 (JP) ................................ 2010-063843

(51) Int. Cl.
*F41G 9/00* (2006.01)
*G06F 17/10* (2006.01)
*G06G 7/78* (2006.01)

(52) U.S. Cl.
USPC .................. 701/302; 701/1; 701/23; 701/45; 701/122; 701/408; 340/435; 340/438

(58) Field of Classification Search
USPC .................. 701/1, 23, 41, 45, 116, 117, 122, 701/408, 411, 466, 300, 302; 340/905, 995.1, 340/435, 436, 437, 438, 501
See application file for complete search history.

(56) References Cited

U.S. PATENT DOCUMENTS

| | | | | |
|---|---|---|---|---|
| 6,208,927 B1 * | 3/2001 | Mine et al. | ...................... | 701/70 |
| 7,107,137 B2 * | 9/2006 | Tange et al. | ..................... | 701/70 |
| 7,424,357 B2 * | 9/2008 | Ozaki et al. | ..................... | 701/70 |
| 7,444,224 B2 * | 10/2008 | Sadano et al. | .................. | 701/80 |
| 7,509,211 B2 * | 3/2009 | Niwa et al. | ..................... | 701/417 |
| 7,688,186 B2 * | 3/2010 | Kataoka et al. | ............... | 340/435 |
| 7,765,066 B2 * | 7/2010 | Braeuchle et al. | ............ | 701/301 |
| 8,036,781 B2 * | 10/2011 | Egami | ............................... | 701/1 |
| 8,355,539 B2 * | 1/2013 | Tan et al. | ...................... | 382/104 |
| 2005/0107939 A1 | 5/2005 | Sadano et al. | | |
| 2010/0191421 A1 * | 7/2010 | Nilsson | ........................... | 701/41 |

FOREIGN PATENT DOCUMENTS

JP 2005-145243 A 6/2005

* cited by examiner

*Primary Examiner* — Thomas H. Tarcza
*Assistant Examiner* — Rami Khatib
(74) *Attorney, Agent, or Firm* — Foley & Lardner LLP

(57) ABSTRACT

A vehicle control apparatus includes a first section that recognizes a lane boundary line of a lane in which a vehicle is traveling. A second section recognizes a present position of a predetermined reference point of the vehicle. A third section calculates a predicted position of the reference point, wherein the predicted position is a predetermined interval ahead of the present position. A fourth calculates an imaginary lane boundary line, wherein the imaginary lane boundary line is tangent to the lane boundary line at a point close to the predicted position. A fifth section performs a control of preventing the vehicle from deviating from the lane by controlling the vehicle depending on positional relationship between the vehicle and the lane boundary line. A sixth section selectively permits and suppresses the control depending on positional relationship among the imaginary lane boundary line, the present position, and the predicted position.

7 Claims, 7 Drawing Sheets

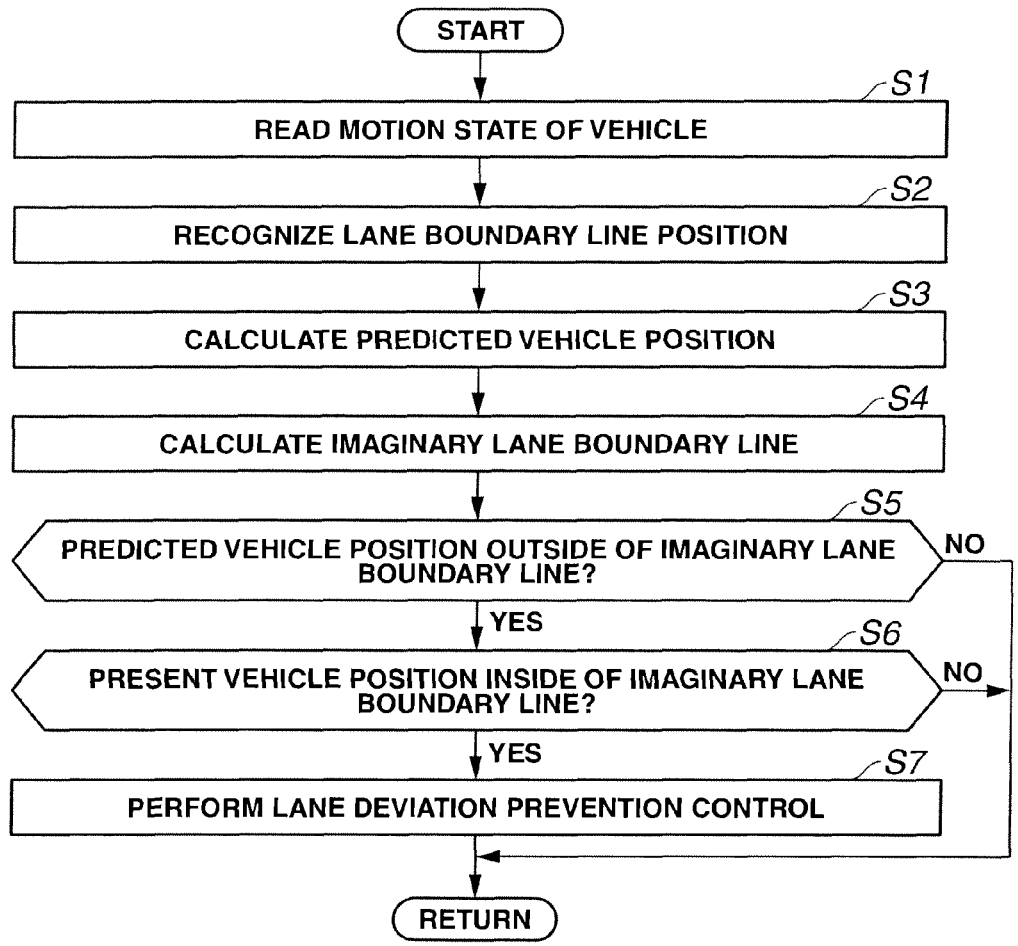
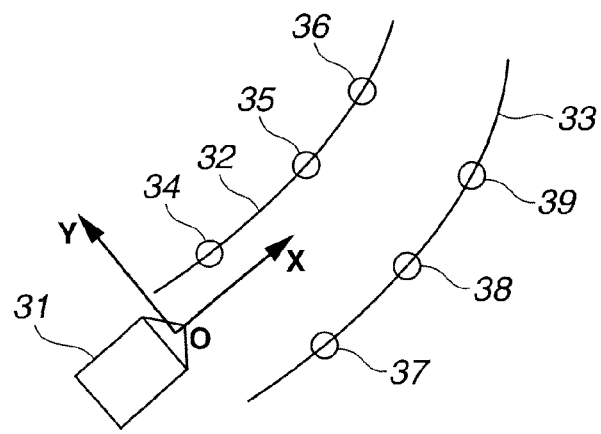

VEHICLE CONTROL APPARATUS AND VEHICLE CONTROL METHOD

BACKGROUND OF THE INVENTION

The present invention relates to vehicle control apparatus and vehicle control method.

Japanese Patent Application Publication No. 2005-145243 discloses a vehicle control apparatus, which is configured to perform a lane deviation prevention control for a host vehicle by applying a yawing moment to the vehicle when the vehicle has a tendency to deviate from a lane in which the vehicle is traveling. The vehicle control apparatus inhibits the lane deviation prevention control when the vehicle has a tendency to deviate inwardly from a curved lane. The inhibition is intended for preventing the lane deviation prevention control from being performed against driver's intention.

SUMMARY OF THE INVENTION

It is desirable to provide a vehicle control apparatus and a vehicle control method with which a lane deviation prevention control is performed more in conformance with driver's intention.

According to one aspect of the present invention, a vehicle control apparatus comprises: a lane boundary line recognizing section configured to recognize a lane boundary line of a lane in which a vehicle is traveling; a present vehicle position recognizing section configured to recognize a present position of a predetermined reference point of the vehicle, wherein the reference point is located within or close to the vehicle; a predicted vehicle position calculating section configured to calculate a predicted position of the reference point, wherein the predicted position is a predetermined interval ahead of the present position; an imaginary lane boundary line calculating section configured to calculate an imaginary lane boundary line, wherein the imaginary lane boundary line is substantially tangent to the lane boundary line at a point close to the predicted position; a lane deviation prevention control section configured to perform a lane deviation prevention control of preventing the vehicle from deviating from the lane by controlling the vehicle depending on positional relationship between the vehicle and the lane boundary line; and an operation permitting section configured to selectively permit and suppress the lane deviation prevention control depending on positional relationship among the imaginary lane boundary line, the present position, and the predicted position. The operation permitting section may be configured to: permit the lane deviation prevention control in response to a condition that the predicted position is outside of the imaginary lane boundary line and the present position is inside of the imaginary lane boundary line; and suppress the lane deviation prevention control in response to a condition that the predicted position is inside of the imaginary lane boundary line or the present position is outside of the imaginary lane boundary line.

According to another aspect of the present invention, a vehicle control apparatus comprises: a lane deviation tendency calculating section configured to calculate a tendency of a vehicle to deviate from a lane in which the vehicle is traveling; and a lane deviation suppression control section configured to perform a lane deviation suppression control of suppressing the tendency by applying at least one of a yawing moment and a decelerating force to the vehicle in response to determination that the vehicle has the tendency to deviate from the lane, wherein the lane deviation suppression control section is further configured to: perform the lane deviation suppression control in response to determination that the tendency is a tendency to deviate outwardly from the lane; and selectively perform and limit the lane deviation suppression control depending on state of the tendency in response to determination that the tendency is a tendency to deviate inwardly from the lane. The vehicle control apparatus may be configured so that: the lane deviation tendency calculating section includes: a lane boundary line recognizing section configured to recognize a lane boundary line of the lane; a present vehicle position recognizing section configured to recognize a present position of a predetermined reference point of the vehicle, wherein the reference point is located within the vehicle; a predicted vehicle position calculating section configured to calculate a predicted position of the reference point, wherein the predicted position is a predetermined interval ahead of the present position in a direction in which the vehicle is traveling; and an imaginary lane boundary line calculating section configured to calculate an imaginary lane boundary line, wherein the imaginary lane boundary line is substantially tangent to the lane boundary line at a point close to the predicted position; and the lane deviation suppression control section is configured to: perform the lane deviation prevention control in response to a condition that the predicted position is outside of the imaginary lane boundary line and the present position is inside of the imaginary lane boundary line; and limit the lane deviation prevention control in response to a condition that the predicted position is inside of the imaginary lane boundary line or the present position is outside of the imaginary lane boundary line.

According to a further aspect of the present invention, a vehicle control method comprises: determining whether or not a vehicle has a tendency to deviate from a curved lane in which the vehicle is traveling; suppressing the tendency by applying at least one of a yawing moment and a decelerating force to the vehicle in response to determination that the vehicle has the tendency; permitting the suppression constantly in response to determination that the tendency is a tendency to deviate outwardly from the lane; permitting the suppression in response to determination that the tendency is a tendency to deviate inwardly from the lane and satisfies a predetermined condition; and suppressing the suppression in response to determination that the tendency is a tendency to deviate inwardly from the lane and fails to satisfy the condition.

BRIEF DESCRIPTION OF THE DRAWINGS

FIG. 3 is a flow chart showing a lane deviation prevention control performed by the electrical control unit.

FIG. 4 is a diagram showing a vehicle-fixed coordinate system in which left and right lane boundary lines are defined.

DETAILED DESCRIPTION OF THE INVENTION

Figure 1:
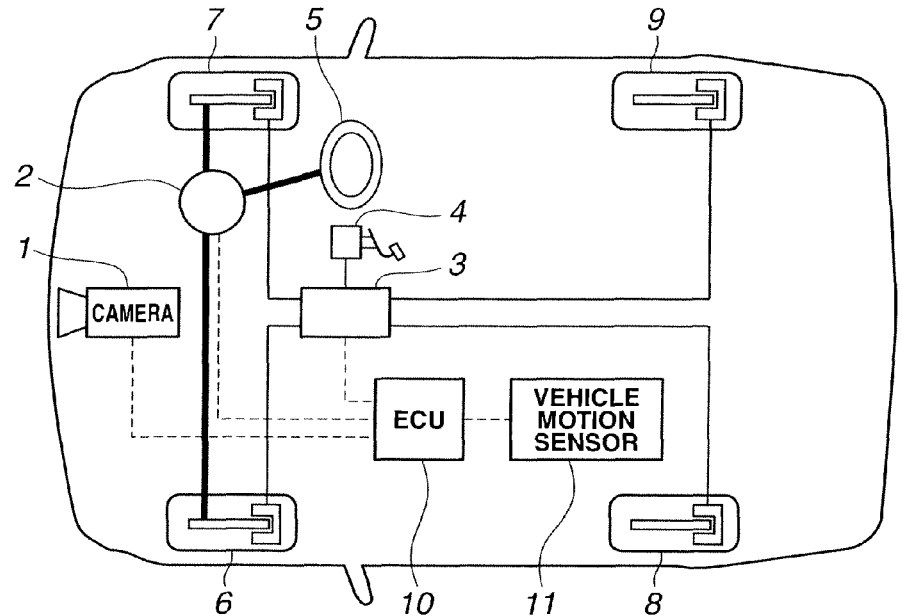
FIG. 1 is a schematic diagram showing system configuration of a motor vehicle provided with a vehicle control apparatus according to a first embodiment of the present invention.

<First Embodiment> FIG. 1 schematically shows system configuration of a motor vehicle provided with a vehicle control apparatus according to a first embodiment of the present invention. The motor vehicle is provided with a camera 1, an electric power steering device 2, an electrohydraulic brake unit 3, a brake booster 4, a steering wheel 5, a left front wheel 6, a right front wheel 7, a left rear wheel 8, a right rear wheel 9, an electrical control unit 10, and a vehicle motion sensor 11.

Camera 1 is mounted to a central portion of a front end of the vehicle in the direction of travel, and directed forward to acquire imagery of environment ahead of the vehicle. Electric power steering device 2 is linked between steering wheel 5 and left and right front wheels 6, 7, and configured to steer left and right front wheels 6, 7 in response to a command depending on steering wheel angle of steering wheel 5. Electric power steering device 2 may be further configured to steer left and right front wheels 6, 7 independently of the steering wheel angle. Electrohydraulic brake unit 3 is configured to control braking forces of the four road wheels according to driver's brake operation and/or according to vehicle operating state. Brake booster 4 is arranged to boost driver's brake operating force, and output the boosted force to electrohydraulic brake unit 3. Vehicle motion sensor 11 is arranged to measure vehicle speed, vehicle longitudinal acceleration, vehicle lateral acceleration, vehicle yaw rate, steering wheel angle, steering torque, etc., and output information about these quantities to electrical control unit 10.

Electrical control unit 10 is configured to control camera 1, electric power steering device 2 and electrohydraulic brake unit 3 depending on the information from vehicle motion sensor 11. Electrical control unit 10 performs a lane deviation prevention control (or lane deviation suppression control), in which in response to determination that the host vehicle has a tendency to deviate from a lane in which the vehicle is traveling, and cross a lane boundary line that is recognized from imagery acquired by camera 1, the electrical control unit 10 operates electric power steering device 2 and/or electrohydraulic brake unit 3 so as to apply at least one of a yawing moment and a decelerating force to the vehicle, and thereby prevent or suppress deviation of the host vehicle from the lane.

Electrohydraulic brake unit 3 applies equal braking torques to left and right front wheels 6, 7, and equal braking torques to left and right rear wheels 8, 9, when operated manually by the driver in a normal mode in which the lane deviation prevention control is inactive. On the other hand, when the lane deviation prevention control is active, electrohydraulic brake unit 3 can apply unequal braking torques to left and right front wheels 6, 7, and/or unequal braking torques to left and right rear wheels 8, 9, so as to apply a yawing moment to the vehicle. Moreover, when the lane deviation prevention control is active, electric power steering device 2 produces a merged assist force depending on a request of driver's steering operation and a request of the lane deviation prevention control.

Figure 2:
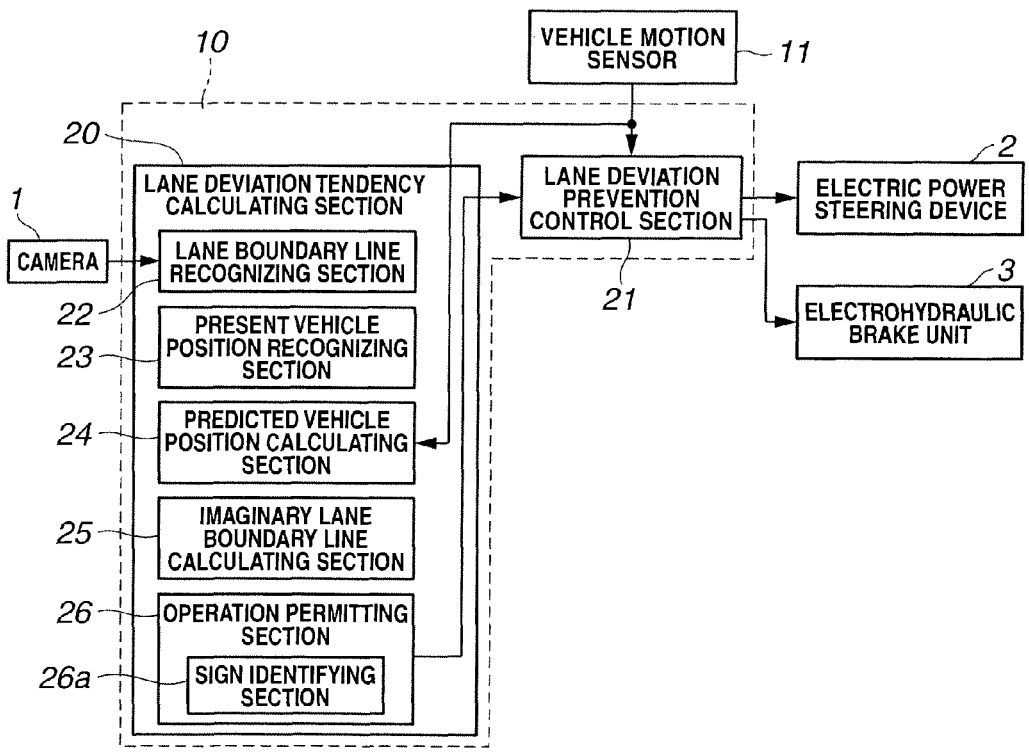
FIG. 2 is a control block diagram showing system configuration of an electrical control unit according to the first embodiment.

FIG. 2 shows system configuration of electrical control unit 10. Electrical control unit 10 includes a lane deviation tendency calculating section 20 and a lane deviation prevention control section (lane deviation suppression control section) 21. Lane deviation tendency calculating section 20 is configured to calculate a tendency of the vehicle to deviate from a lane where the vehicle is traveling. Lane deviation prevention control section 21 is configured to perform a lane deviation prevention control (or lane deviation suppression control), in which in response to determination of lane deviation tendency calculating section 20 that the host vehicle has a tendency to deviate from the lane, the lane deviation prevention control section 21 operates electric power steering device 2 and/or electrohydraulic brake unit 3 so as to apply at least one of a yawing moment and a decelerating force to the vehicle, and thereby prevent or suppress the deviating tendency of the host vehicle. Lane deviation prevention control section 21 is thus configured to perform a vehicle motion suppression control of suppressing motion of the vehicle by controlling the motion of the vehicle depending on positional relationship between the vehicle and the lane, i.e. a lane deviation prevention control of preventing the vehicle from deviating from the lane by controlling the vehicle depending on positional relationship between the vehicle and the lane boundary line.

Lane deviation tendency calculating section 20 includes a lane boundary line recognizing section 22, a present vehicle position recognizing section 23, a predicted vehicle position calculating section 24, an imaginary lane boundary line calculating section 25, and an operation permitting section 26.

Lane boundary line recognizing section 22 is configured to refer to the imagery of environment ahead of the vehicle, which is acquired by camera 1, and recognize lane boundary lines on the left and right sides of the lane in which the vehicle is traveling. The lane boundary lines are defined by white lines, guard rails, curvs, etc.

Present vehicle position recognizing section 23 is configured to recognize the present position of the vehicle with respect to the lane. Specifically, present vehicle position recognizing section 23 recognizes the present position of a predetermined reference point of the vehicle, wherein the reference point is located within or close to the vehicle. The vehicle is provided with a pair of reference points for left and right lane boundary lines. The reference points may be located at left and right ends of the front end of the host vehicle.

Predicted vehicle position calculating section 24 is configured to recognize a predicted position of the vehicle with respect to the lane, wherein the predicted position is a predetermined interval ahead of the present vehicle position in the direction of travel. Namely, predicted vehicle position calculating section 24 recognizes a predicted position of a predetermined reference point of the host vehicle, wherein the predicted position is a predetermined interval ahead of the present position in the direction of travel. Specifically, the predicted position is a position predicted to be reached by the reference point after a predetermined period of time. This period of time may be set to decrease with an increase in the travel speed of the host vehicle. The vehicle is provided with a pair of reference points for left and right lane boundary lines, which correspond to the two reference points for the present vehicle position. In this example, the reference points for the predicted vehicle position are identical to the reference points for the present vehicle position. In the case where the reference points for the present vehicle position are located at the left and right ends of the front end of the host vehicle, the reference points for the predicted vehicle position are also set at the left and right ends of the front end of the host vehicle.

Imaginary lane boundary line calculating section 25 is configured to calculate an imaginary lane boundary line which is a line substantially tangent to a lane boundary line at an arbitrary point close to the predicted vehicle position. In this embodiment, two imaginary lane boundary lines are calculated for the predicted positions of the left and right reference points. The left imaginary lane boundary line tangent to the left lane boundary line is located close to the predicted position of the left reference point, whereas the right imaginary lane boundary line tangent to the right lane boundary line is located close to the predicted position of the right reference point.

Operation permitting section 26 is configured to determine whether or not it is necessary to perform the lane deviation prevention control, i.e. whether or not it is necessary to intervene in the lane deviation prevention control, and selectively permit and suppress the lane deviation prevention control, depending on positional relationship among the imaginary lane boundary line, the present vehicle position, and the predicted vehicle position. Operation permitting section 26 includes a sign identifying section 26a. Sign identifying section 26a is configured to: calculate a first line connecting the present vehicle position and the imaginary lane boundary line; calculate a second line connecting the predicted vehicle position and the imaginary lane boundary line; and identify a first sign indicating a direction of the first line with respect to the imaginary lane boundary line, and a second sign indicating a direction of the second line with respect to the imaginary lane boundary line. Specifically, the first line is a line perpendicular to the imaginary lane boundary line and extending from the present vehicle position, whereas the second line is a line perpendicular to the imaginary lane boundary line and extending from the predicted vehicle position. The imaginary lane boundary line divides the whole area into a lane inside region and an outside region. When the first and second lines are located in the same region, the first and second signs are identical to each other. On the other hand, when the first and second lines are located in different regions, the first and second signs are different from each other. Operation permitting section 26 determines that the lane deviation prevention control is unnecessary, in response to situations where sign identifying section 26a determines that the signs of the first and second lines are identical to each other when the host vehicle is traveling in an imaginary lane which is defined by left and right imaginary lane boundary lines. On the other hand, operation permitting section 26 determines that the lane deviation prevention control is necessary, in response to situations where sign identifying section 26a determines that the signs of the first and second lines are different from each other when the host vehicle is traveling in the imaginary lane. Namely, operation permitting section 26 determines that the lane deviation prevention control is necessary, when the predicted vehicle position is located outside of the imaginary lane boundary line and the present vehicle position is located inside of the imaginary lane boundary line, and determines in other situations that the lane deviation prevention control is unnecessary.

Lane deviation prevention control section 21 is configured to perform the lane deviation prevention control when operation permitting section 26 determines that the lane deviation prevention control is necessary, and suspend the lane deviation prevention control when operation permitting section 26 determines that the lane deviation prevention control is unnecessary.

<Lane Deviation Prevention Control> FIG. 3 shows a process of lane deviation prevention control performed by electrical control unit 10. This process is repeatedly executed at calculation intervals of a predetermined period, for example, about 10 ms.

At Step S1, electrical control unit 10 makes lane deviation prevention control section 21 read from vehicle motion sensor 11 the information about vehicle speed, vehicle longitudinal acceleration, vehicle lateral acceleration, vehicle yaw rate, steering wheel angle, steering torque, etc.

At Step S2, electrical control unit 10 makes lane boundary line recognizing section 22 receive from camera 1 the imagery about the forward environment, and locate the lane boundary lines with reference to the imagery. The lane boundary lines are defined in the vehicle-fixed coordinate system. Generally, other objects are located also in the vehicle-fixed coordinate system in the following. In this example, the coordinate system is defined so that the origin point is a point of host vehicle 31 to which camera 1 is attached, the x-axis extends in the direction of travel of host vehicle 31, and the y-axis is perpendicular to the x-axis and extending in the vehicle lateral direction. Left and right lane boundary lines 32, 33 are on the left and right sides of the lane respectively. The lane boundary lines may be represented by several points such as points 34, 35, 36, 37, 38, 39 in FIG. 4, which is advantageous in reducing the load of calculation.

At Step S3, electrical control unit 10 makes present vehicle position recognizing section 23 recognize the present vehicle position which is represented by the present position of an arbitrary reference point that is located within the vehicle or close to the vehicle. In this example, two reference points are set for the left and right lane boundary lines, in order to recognize the positional relationship between the vehicle and left and right lane boundary lines. The reference points may be set at left and right ends of the front end of the vehicle. Then, electrical control unit 10 makes predicted vehicle position calculating section 24 calculate a predicted vehicle position that is predicted to be reached by the host vehicle a predetermined period of time after travel from the present vehicle position, wherein the predicted vehicle position is represented by a predicted position of the reference point of the vehicle. The calculation is based on the information read at Step S1 and information about specifications of the vehicle memorized beforehand in electrical control unit 10. Specifically, the predicted vehicle position is calculated based on the vehicle speed, steering angle, yaw rate, vehicle width, and vehicle length, and the position of the point to which camera 1 is attached. In this example, two reference points for the predicted vehicle position are set for the left and right lane boundary lines, in order to recognize the positional relationship between the vehicle and left and right lane boundary lines as for the present vehicle position.

Figure 5A:
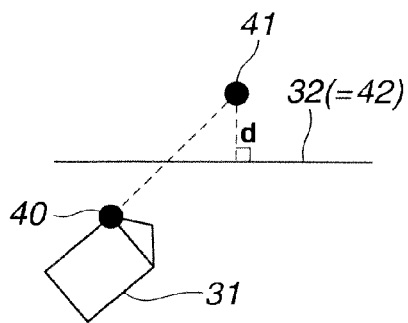
FIGS. 5A, 5B and 5C are diagrams showing a method to calculate an imaginary lane boundary line based on a lane boundary line.
Figure 5B:
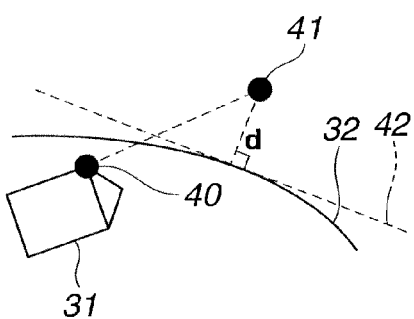
Figure 5C:
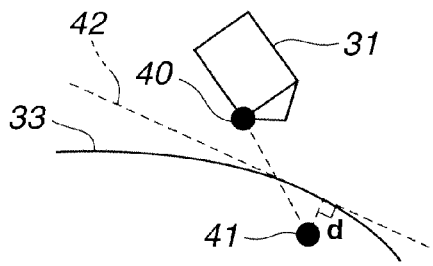
Figure 6A:
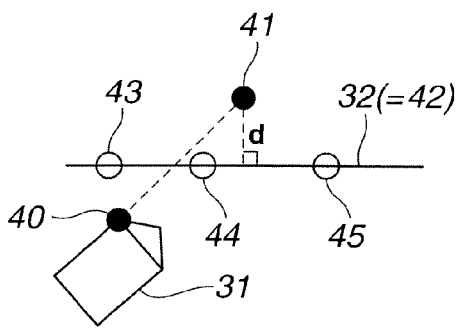
FIGS. 6A, 6B and 6C are diagrams showing a method to calculate an imaginary lane boundary line based on representative points of a lane boundary line.
Figure 6B:
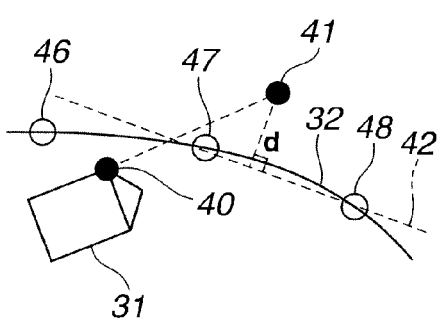
Figure 6C:
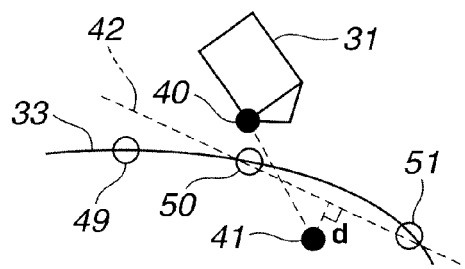

At Step S4, electrical control unit 10 makes imaginary lane boundary line calculating section 25 calculate imaginary lane boundary lines. In this example, each imaginary lane boundary line is a line tangent to the lane boundary line at a point close to the predicted vehicle position. More specifically, left and right imaginary lane boundary lines 42 are lines each of which is tangent to the corresponding lane boundary line at a point closest to predicted vehicle position 41 that is a position predicted to be reached after travel of host vehicle 31 for a predetermined period from present vehicle position 40, as shown in FIGS. 5A, 5B and 5C. FIG. 5A shows a situation in which host vehicle 31 has a tendency to deviate from a straight lane through a left lane boundary line 32. FIG. 5B shows a situation in which host vehicle 31 has a tendency to deviate from a curved lane through left lane boundary line 32 located outside of the curve. FIG. 5C shows a situation in which host vehicle 31 has a tendency to deviate from a curved lane through a right lane boundary line 33 located inside of the curve. In the case where each lane boundary line is represented by several points for reducing the load of calculation, two points on the lane boundary line close to predicted vehicle position 41 are selected and connected to form an imaginary lane boundary line, as shown in FIGS. 6A, 6B and 6C. FIG. 6A shows a case in which the straight line connecting the two points 44, 45 forms an imaginary lane boundary line. FIG. 6B shows a case in which the straight line connecting the two points 47, 48 forms an imaginary lane boundary line. FIG. 6C shows a case in which the straight line connecting the two points 50, 51 forms an imaginary lane boundary line. Herein, a deviation quantity d is defined as a distance between predicted vehicle position 41 and imaginary lane boundary line 42.

Figure 7A:
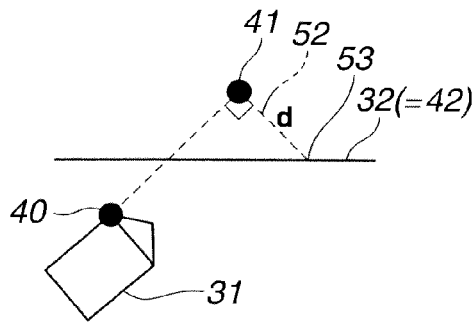
FIGS. 7A, 7B and 7C are diagrams showing a method to calculate an imaginary lane boundary line based on a lane boundary line.
Figure 7B:
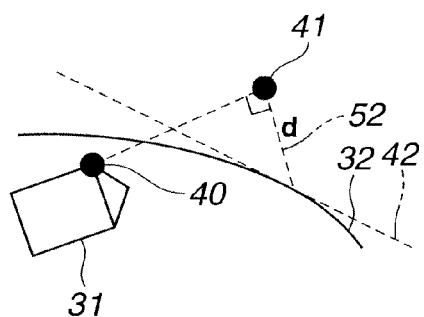
Figure 7C:
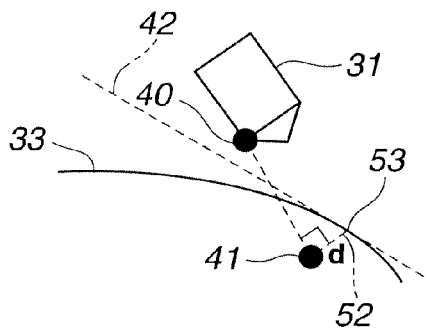
Figure 8A:
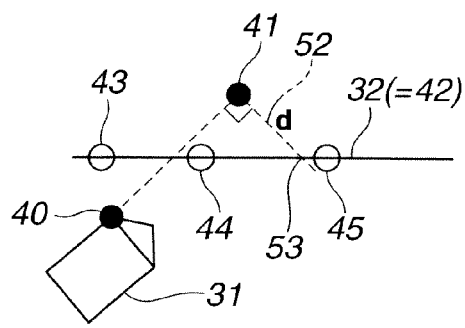
FIGS. 8A, 8B and 8C are diagrams showing a method to calculate an imaginary lane boundary line based on representative points of a lane boundary line.
Figure 8B:
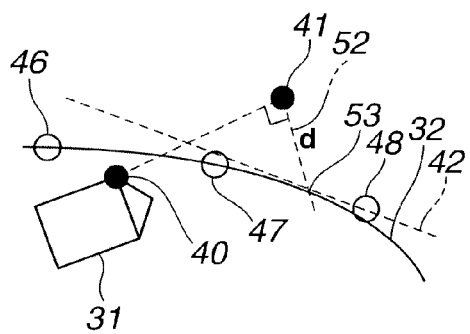
Figure 8C:
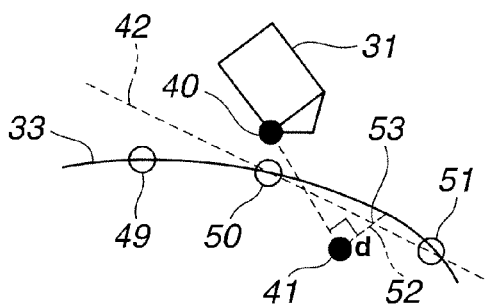

Imaginary lane boundary line 42 may be defined as a line tangent to lane boundary line 32 or 33 at an intersection point 53 where lane boundary line 32 or 33 intersects with a straight line 52 perpendicular to the direction of travel of host vehicle 31, as shown in FIGS. 7A, 7B and 7C. In the case where the lane boundary line is represented by several points for reducing the load of calculation, two points on the lane boundary line close to predicted vehicle position 41 are selected and connected to form an imaginary lane boundary line, as shown in FIGS. 8A, 8B and 8C. FIG. 8A shows a case in which the straight line connecting the two points 44, 45 forms an imaginary lane boundary line. FIG. 8B shows a case in which the straight line connecting the two points 47, 48 forms an imaginary lane boundary line. FIG. 8C shows a case in which the straight line connecting the two points 50, 51 forms an imaginary lane boundary line. In this case, the deviation quantity d is defined as a distance between predicted vehicle position 41 and intersection point 53 where imaginary lane boundary line 42 intersects with straight line 52.

According to the method described above, an imaginary lane boundary line is set identical to a corresponding lane boundary line in a straight line, or outside of a lane boundary line in an outside area of a curved lane, or inside of a lane boundary line in an inside area of a curved lane. The imaginary lane boundary line may be adjusted, for example, by shifting with a slight offset, or by rotating.

At Step S5, electrical control unit 10 makes operation permitting section 26 determine whether or not the predicted vehicle position 41 is located outside of the imaginary lane boundary line calculated at Step S4. When the answer to Step S5 is affirmative (YES), the process proceeds to Step S6. On the other hand, when the answer to Step S5 is negative (NO), electrical control unit 10 returns from this process.

At Step S6, electrical control unit 10 makes operation permitting section 26 determine whether or not the present vehicle position 40 is located inside of the imaginary lane boundary line. When the answer to Step S6 is YES, the process proceeds to Step S7. On the other hand, when the answer to Step S6 is NO, electrical control unit 10 returns from this process.

At Step S7, electrical control unit 10 makes lane deviation prevention control section 21 perform a lane deviation prevention control, in which lane deviation prevention control section 21 calculates a manipulated variable M by multiplying the deviation quantity d by a gain K using equation (1), and operate the electric power steering device 2 and/or electrohydraulic brake unit 3 based on the manipulated variable M so as to apply a yawing moment and/or a decelerating force to the vehicle.

$$M = K \cdot d \tag{1}$$

The following describes how the vehicle control apparatus according to the present embodiment operates in different situations.

Figure 9:
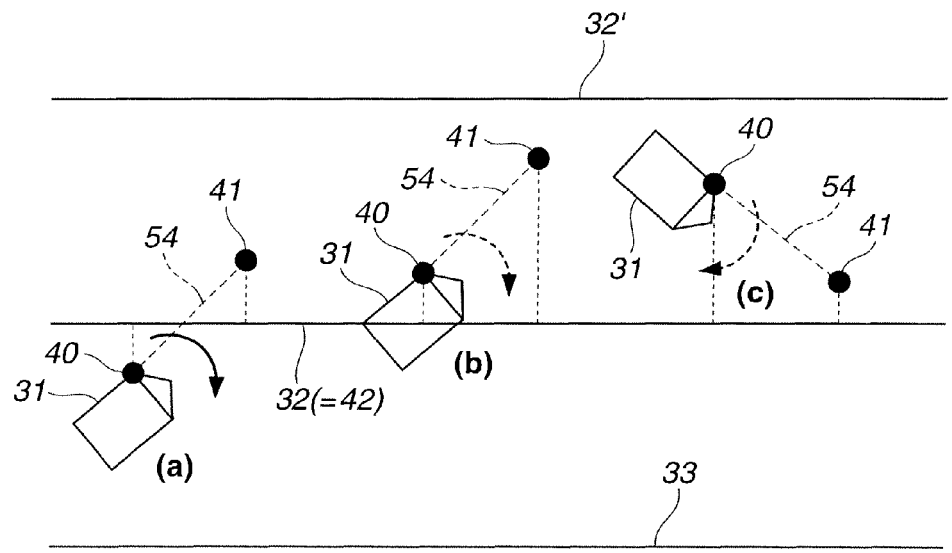
FIG. 9 is a diagram showing how the vehicle control apparatus performs the lane deviation prevention control when the vehicle is traveling on a straight road.

<Operation on Straight Road> FIG. 9 shows how the vehicle control apparatus performs the lane deviation prevention control when the vehicle is traveling on a straight road. FIG. 9 shows a situation where a straight road includes two straight lanes, and a host vehicle is shifting from one of the lanes to the other lane. In cases of straight road, the imaginary lane boundary line is identical to the lane boundary line. It is assumed that camera 1 recognizes that the host vehicle 31 is traveling in the lane on the lower side of the road in FIG. 9. An imaginary lane is defined by left and right lane boundary lines 32, 33. In a situation (a) in FIG. 9, the lane deviation prevention control is performed because predicted vehicle position 41 is located outside of imaginary lane boundary line 42 and present vehicle position 40 is located inside of imaginary lane boundary line 42. This serves to prevent the host vehicle 31 from deviating from the current lane to the adjacent lane.

In a situation (b) in FIG. 9, the lane deviation prevention control is suspended because both of present vehicle position 40 and predicted vehicle position 41 are located outside of imaginary lane boundary line 42. The situation (b) is immediately after the situation (a). During the period from the situation (a) to the situation (b), host vehicle 31 moves toward the adjacent lane although the lane deviation prevention control is being performed to suppress the movement of host vehicle 31. In such a situation, the driver is likely to have an intention to change lanes. If the lane deviation prevention control is performed in the situation (b), the trajectory of host vehicle 31 may deviate from driver's intention, or host vehicle 31 may behave unexpectedly, which may cause the driver to feel uncomfortable. In contrast, the vehicle control apparatus according to the present embodiment suspends the lane deviation prevention control in such situations, and thereby serves to prevent the driver from feeling uncomfortable.

In a situation (c) in FIG. 9, the lane deviation prevention control is suspended because both of present vehicle position 40 and predicted vehicle position 41 are located outside of imaginary lane boundary line 42, as in the situation (b). In contrast to the situation (b), it is uncertain in the situation (c) whether or not the driver has an intention to change lanes. In the situation (c), even if the driver has no intention to change lanes, lane deviation is unlikely because predicted vehicle position 41 is located on the same side outside of imaginary lane boundary line 42 as present vehicle position 40. On the other hand, if the driver has an intention to change lanes, execution of the lane deviation prevention control may cause the driver to feel uncomfortable. In contrast, the vehicle control apparatus according to the present embodiment suspends the lane deviation prevention control in such situations, and thereby serves to prevent the driver from feeling uncomfortable.

Figure 10:
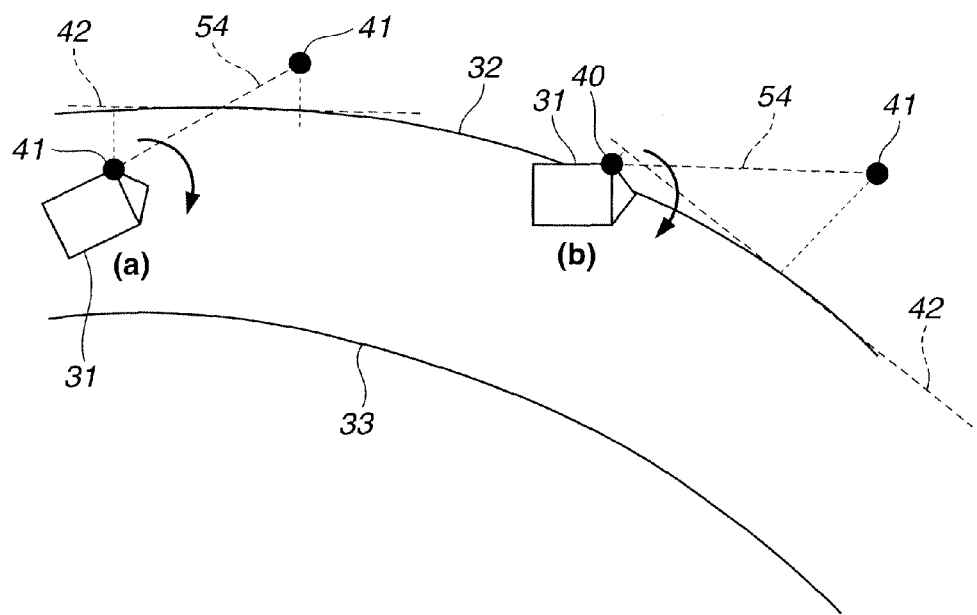
FIG. 10 is a diagram showing how the vehicle control apparatus performs the lane deviation prevention control when the vehicle is traveling in an outside area of a curved road.

<Operation in Outside Area of Curved Road> FIG. 10 shows how the vehicle control apparatus performs the lane deviation prevention control when the vehicle is traveling in an outside area of a curved road. In this area, the imaginary lane boundary line 42 is located outside of left lane boundary line 32. When host vehicle 31 is traveling inside of left lane boundary line 32, present vehicle position 40 is always located inside of imaginary lane boundary line 42. Accordingly, when the predicted vehicle position 41 crosses imaginary lane boundary line 42 and moves to outside of imaginary lane boundary line 42 while host vehicle 31 is traveling in this area, the vehicle control apparatus always performs the lane deviation prevention control. Namely, the lane deviation prevention control is performed, not only in a situation (a) where host vehicle 31 is located inside the left lane boundary line 32, but also in a situation (b) where host vehicle 31 is located slightly outside of left lane boundary line 32 but inside of imaginary lane boundary line 42. This serves to ensure the execution of the lane deviation prevention control when necessary, and thereby make the driver feel safe. When imaginary lane boundary line 42 is defined in the manner shown in FIGS. 7A, 7B and 7C, imaginary lane boundary line 42 is located more farther outside from left lane boundary line 32 as compared to the case where imaginary lane boundary line 42 is defined in the manner shown in FIG. 5. This broadens the region in which the lane deviation prevention control is performed. This is advantageous in making the driver feel safer.

Figure 11:
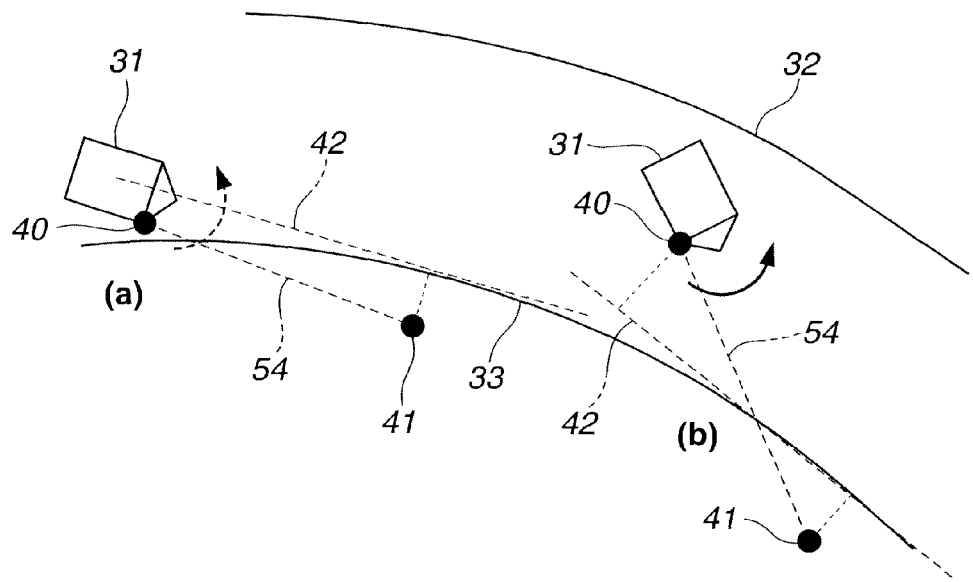
FIG. 11 is a diagram showing how the vehicle control apparatus performs the lane deviation prevention control when the vehicle is traveling in an inside area of a curved road.

<Operation in Inside Area of Curved Road> FIG. 11 shows how the vehicle control apparatus performs the lane deviation prevention control when the vehicle is traveling in an inside area of a curved road. In this area, the imaginary lane boundary line 42 is located inside of right lane boundary line 33. When the vehicle is traveling inside of right lane boundary line 33, a situation (a) is possible where present vehicle position 40 is located outside of imaginary lane boundary line 42 so that the lane deviation prevention control is suspended. Accordingly, even when the predicted vehicle position 41 crosses imaginary lane boundary line 42 and moves to outside of imaginary lane boundary line 42 while host vehicle 31 is traveling in this area, the vehicle control apparatus selectively performs or suspends the lane deviation prevention control depending on the situation. In the situation (a) in which the angle between imaginary lane boundary line 42 and the direction of travel of host vehicle 31 (referred to as deviation angle) is small, it is likely that the driver has an intention to allow host vehicle 31 to approach the inside edge of the current lane. This is because in general, when a vehicle is traveling in a curved road, a driver tends to operate the vehicle to run along the inside edge of the lane. If the lane deviation prevention control is performed in the situation (a), host vehicle 31 may be applied with a yawing moment to rotate host vehicle 31 away from the inside edge of the curved road so that the driver may feel uncomfortable. In contrast, the vehicle control apparatus according to the present embodiment suspends the lane deviation prevention control in the situation (a), and thereby prevents the driver from feeling uncomfortable. In the case where imaginary lane boundary line 42 is defined in the manner shown in FIGS. 7A, 7B and 7C, imaginary lane boundary line 42 is located farther inside from right lane boundary line 33 as compared to the case where imaginary lane boundary line 42 is defined in the manner shown in FIGS. 5A, 5B and 5C. This narrows the region in which the lane deviation prevention control is performed. This is advantageous in the case where the lane deviation prevention control should be performed less frequently. On the other hand, in a situation (b) in which the deviation angle is large, it is unlikely that the driver has an intention to allow host vehicle 31 to run along the inside edge of the lane. Accordingly, the vehicle control apparatus performs the lane deviation prevention control in the situation (b). This ensures execution of the lane deviation prevention control when necessary, and thereby makes the driver feel safe.

As described above, operation permitting section 26 determines the necessity of operation of lane deviation prevention control section 21 depending on the positional relationship among the imaginary lane boundary line, present vehicle position, and predicted vehicle position. This allows to correctly estimate driver's intention, and conform the lane deviation prevention control to the driver's intention, when the vehicle has a tendency to deviate from the current lane. Specifically, operation permitting section 26 determines that the lane deviation prevention control is necessary when the predicted vehicle position is located outside of the imaginary lane boundary line and the present vehicle position is located inside of the imaginary lane boundary line. Otherwise, operation permitting section 26 determines that the lane deviation prevention control is unnecessary. Namely, operation permitting section 26 determines that the lane deviation prevention control is unnecessary, when the sign of the first line and the sign of the second line are identical to each other while the vehicle is traveling in the imaginary lane defined by the left and right imaginary lane boundary lines. When determining that the sign of the first line and the sign of the second line are different from each other, operation permitting section 26 determines that the lane deviation prevention control is necessary. In the inside area of a curved road, even when the predicted vehicle position moves beyond the imaginary lane boundary line, it is likely that the driver has an intention to keep the vehicle to the inside edge. In such a situation, the lane deviation prevention control is inhibited so as to prevent the driver from feeling uncomfortable.

As described above, present vehicle position recognizing section 23 recognizes the present vehicle position with reference to the two reference points, where the reference points are located at left and right ends of the front end of the vehicle. Imaginary lane boundary line calculating section 25 calculates the left imaginary lane boundary line based on the left lane boundary line, and the right imaginary lane boundary line based on the right lane boundary line. This serves to obtain imaginary lane boundary lines that are conformed to the shapes of the left and right lane boundary lines, and thereby accurately estimate the deviating tendency. The monitoring of the two reference points makes it possible to accurately estimate the deviating tendency, because the left front end deviates from the left lane boundary line first when the host vehicle begins to deviate to the left through the left lane boundary line, and the right front end deviates from the right lane boundary line first when the host vehicle begins to deviate to the right through the right lane boundary line.

As described above, predicted vehicle position calculating section 24 calculates the position that is predicted to be reached by the vehicle after a predetermined interval of time, and thereby predicts the positional relationship between the host vehicle and the imaginary lane boundary line after the predetermined interval of time. The predicted vehicle position is calculated with reference to the left and right reference points. This serves to accurately estimate the deviating tendency from the left lane boundary line and the deviating tendency from the right lane boundary line. In this embodiment, two methods are presented in which imaginary lane boundary line calculating section 25 calculates an imaginary lane boundary line. One is to calculate the imaginary lane boundary line based on a point of the lane boundary line that is closest to the predicted vehicle position. The other is to calculate the imaginary lane boundary line based on two points of the lane boundary line that are close to the predicted vehicle position and through which the imaginary lane boundary line is set to pass. In the case of the first method, it is possible to accurately calculate the degree of deviation of the predicted vehicle position from the lane boundary line, i.e. the deviation quantity d from the lane boundary line. This allows to suitably evaluate the manipulated variable M of the lane deviation prevention control, and thereby enhance the quality of the lane deviation prevention control. On the other hand, in the second method, it is unnecessary to calculate the point of the lane boundary line closest to the predicted vehicle position, and the gradient at the closest point, so that the load and time of calculation can be reduced. In addition, the imaginary lane boundary line calculated by the second method is located outside of the imaginary lane boundary line calculated by the first method when the vehicle is traveling in the outside area of a curved road, and is located inside of the imaginary lane boundary line calculated by the first method when the vehicle is traveling in the inside area of a curved road. Accordingly, in the second method, the region in which the lane deviation prevention control is permitted and performed is broader at the outside area of the curved road so that the driver can be made to feel safe, and the region in which the lane deviation prevention control is permitted and performed is narrower at the inside area of the curved road so that the conflict with driver's intention can be suppressed.

The vehicle control apparatus according to the present embodiment produces at least the following advantageous effects <1> to <4>.

<1> A vehicle control apparatus comprising: a lane boundary line recognizing section (22) configured to recognize a lane boundary line (32, 33) of a lane in which a vehicle (31) is traveling; a present vehicle position recognizing section (23) configured to recognize a present position (40) of a predetermined reference point of the vehicle (31), wherein the reference point is located within or close to the vehicle (31); a predicted vehicle position calculating section (24) configured to calculate a predicted position (41) of the reference point, wherein the predicted position (41) is a predetermined interval ahead of the present position (40); an imaginary lane boundary line calculating section (25) configured to calculate an imaginary lane boundary line (42), wherein the imaginary lane boundary line (42) is substantially tangent to the lane boundary line (32, 33) at a point close to the predicted position (41); a lane deviation prevention control section (21) configured to perform a lane deviation prevention control of preventing the vehicle (31) from deviating from the lane by controlling the vehicle (31) depending on positional relationship between the vehicle (31) and the lane boundary line (32, 33); and an operation permitting section (26) configured to selectively permit and suppress the lane deviation prevention control depending on positional relationship among the imaginary lane boundary line (42), the present position (40), and the predicted position (41), serves to accurately determine whether or not the deviating tendency of the vehicle is based on driver' intention, and permit the lane deviation prevention control when the deviating tendency of the vehicle is not based on driver' intention, and inhibit the lane deviation prevention control when the deviating tendency of the vehicle is based on driver' intention. In this way, the vehicle control apparatus serves to suppress or prevent the lane deviation prevention control from being executed against driver's intention, and thereby suppress or prevent the driver from feeling uncomfortable.

<2> The vehicle control apparatus is further configured so that the operation permitting section (26) is configured to: permit the lane deviation prevention control in response to a condition that the predicted position (41) is outside of the imaginary lane boundary line and the present position (40) is inside of the imaginary lane boundary line; and suppress the lane deviation prevention control in response to a condition that the predicted position (41) is inside of the imaginary lane boundary line or the present position (40) is outside of the imaginary lane boundary line. Specifically, the vehicle control apparatus further comprises a sign identifying section (26a), wherein: the sign identifying section (26a) is configured to: calculate a first line connecting the present position (40) and the imaginary lane boundary line (42); calculate a second line connecting the predicted position (41) and the imaginary lane boundary line (42); and identify a first sign indicating a direction of the first line with respect to the imaginary lane boundary line (42), and a second sign indicating a direction of the second line with respect to the imaginary lane boundary line (42); the lane deviation prevention control section (21) is configured to perform a lane deviation suppression control of suppressing deviation of the vehicle (31) from the lane by applying at least one of a yawing moment and a decelerating force to the vehicle (31) in response to determination that the vehicle (31) has a tendency to deviate from the lane; and the operation permitting section (26) is configured to perform a process in response to determination that the vehicle (13) is traveling in an imaginary lane defined by the imaginary lane boundary line, wherein the process includes: permitting the lane deviation suppression control in response to determination that the first and second signs are different from each other; and suppressing the lane deviation suppression control in response to determination that the first and second signs are identical to each other. This vehicle control apparatus serves to suppress or prevent the driver from feeling uncomfortable by inhibiting or suppressing the lane deviation prevention control when the first and second signs are identical to each other so that the deviation angle is small which indicates that the deviating tendency is likely to be in conformance with driver's intention, and serves to make the driver feel safe by permitting and performing the lane deviation prevention control when the first and second signs are different from each other so that the deviation angle is large which indicates that the deviating tendency is likely to be in conflict with driver's intention.

<3> The vehicle control apparatus wherein: the present vehicle position recognizing section (23) is further configured to recognize a present position (40) of another predetermined reference point of the vehicle (31), wherein the reference points are located at left and right sides of the vehicle (31) respectively; and the imaginary lane boundary line calculating section (25) is configured to calculate the imaginary lane boundary line for one of the present positions (40) with reference to the lane boundary line (32, 33) closer to the one of the present positions (40) than another lane boundary line (32, 33) of the lane, serves to obtain imaginary lane boundary lines that are conformed to the shapes of the left and right lane boundary lines, and thereby accurately estimate the deviating tendency. The monitoring of the two reference points makes it possible to accurately estimate the deviating tendency, because the left front end deviates from the left lane boundary line first when the host vehicle begins to deviate to the left through the left lane boundary line, and the right front end deviates from the right lane boundary line first when the host vehicle begins to deviate to the right through the right lane boundary line.

<4> A vehicle control apparatus comprising: a lane deviation tendency calculating section (20) configured to calculate a tendency of a vehicle (31) to deviate from a lane in which the vehicle (31) is traveling; and a lane deviation suppression control section (21) configured to perform a lane deviation suppression control of suppressing the tendency by applying at least one of a yawing moment and a decelerating force to the vehicle (31) in response to determination that the vehicle (31) has the tendency to deviate from the lane, wherein the lane deviation suppression control section (21) is further configured to: perform the lane deviation suppression control in response to determination that the tendency is a tendency to deviate outwardly from the lane; and selectively perform and limit the lane deviation suppression control depending on state of the tendency in response to determination that the tendency is a tendency to deviate inwardly from the lane, serves to prevent the lane deviation prevention control from being carried out in conflict with driver's intention, and thereby prevent or suppress the driver from feeling uncomfortable. This is because in general, when a vehicle is traveling in a curved road, a driver tends to operate the vehicle to run along the inside edge of the lane. If the vehicle has a tendency to deviate outwardly from the lane, it is almost true that the deviation tendency is not based on driver's intention. On the other hand, if the vehicle has a tendency to deviate inwardly from the lane, it is possible that the deviation tendency is based on driver's intention. This can be estimated with reference to the state of deviation tendency, i.e. the positional relationship among the present vehicle position, predicted vehicle position, and imaginary lane boundary line in the first embodiment, as described above.

Figure 12:
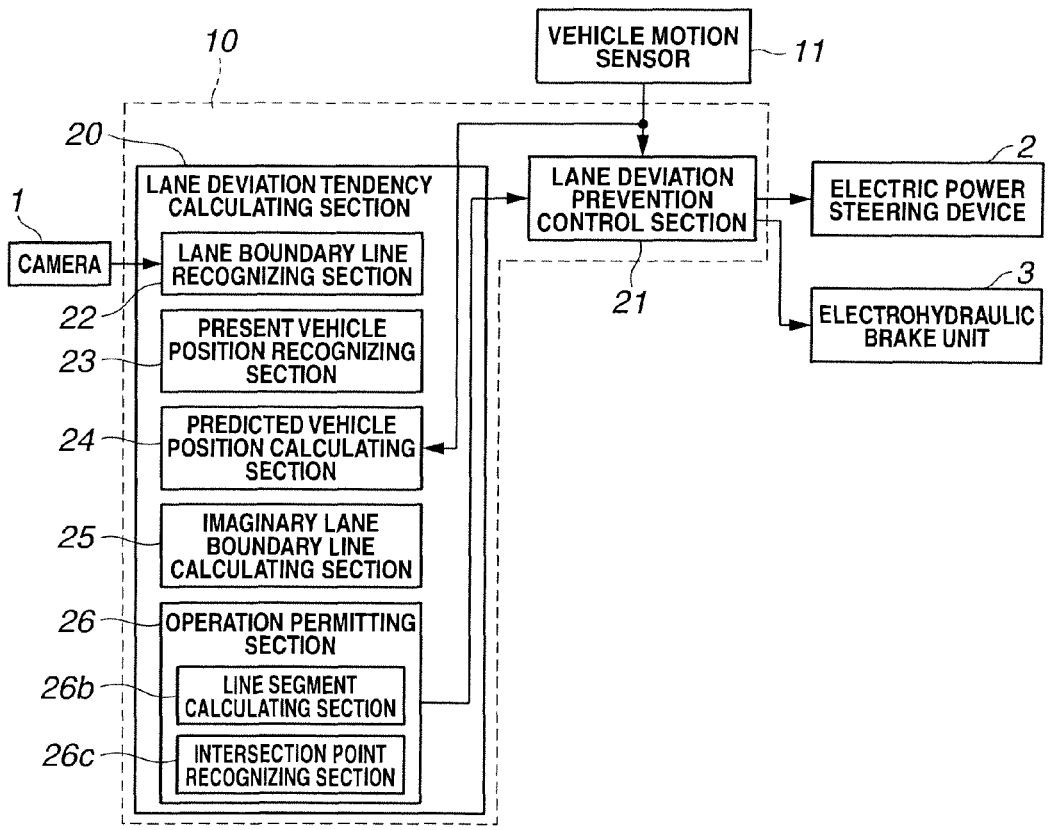
FIG. 12 is a control block diagram showing system configuration of an electrical control unit according to a second embodiment of the present invention.

<Second Embodiment> FIG. 12 shows system configuration of electrical control unit 10 according to a second embodiment of the present invention. In the second embodiment, operation permitting section 26 is modified by replacing the sign identifying section 26a with a line segment calculating section 26b and an intersection point recognizing section 26c. Other components are the same as in the first embodiment, and given the same reference characters.

Line segment calculating section 26b is configured to calculate a line segment connecting the present vehicle position 40 and predicted vehicle position 41. In general, the point on which the driver is focusing attention is located on this line segment. Accordingly, in the case where the reference point is located at the front corner of the vehicle, this line segment is a line segment connecting the focused point and this reference point.

Intersection point recognizing section 26c is configured to recognize an intersection point at which the calculated imaginary lane boundary line intersects with the line segment calculated by line segment calculating section 26b. Operation permitting section 26 is configured to perform a process in response to determination that the vehicle is traveling in an imaginary lane defined by the imaginary lane boundary line, wherein the process includes: determining whether or not the line segment intersects with the imaginary lane boundary line; determining that the lane deviation prevention control is necessary and permitting the lane deviation prevention control in response to determination that the line segment intersects with the imaginary lane boundary line.

Figure 13:
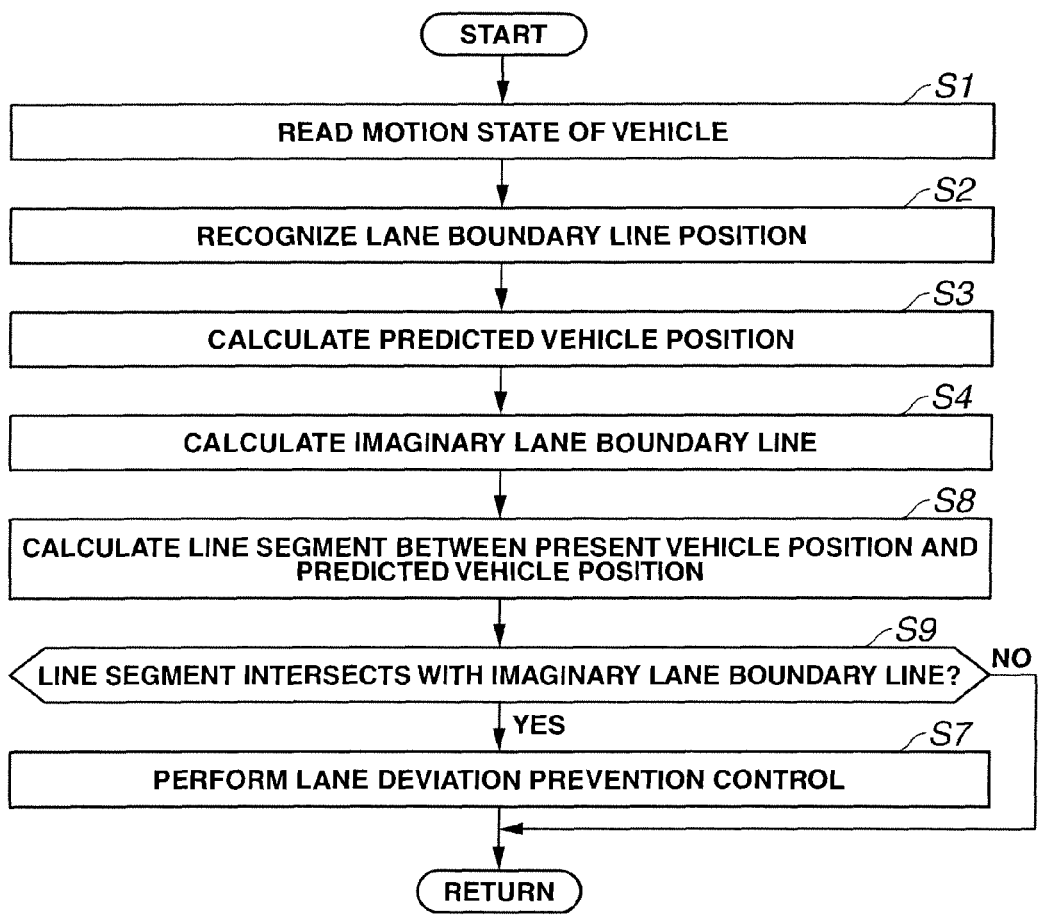
FIG. 13 is a flow chart showing a lane deviation prevention control performed by the electrical control unit of FIG. 12.

<Lane Deviation Prevention Control> FIG. 13 shows a process of lane deviation prevention control performed by electrical control unit 10 according to the second embodiment. This process is created by replacing Steps S5 and S6 in FIG. 3 with Steps S8 and S9.

At Step S8, electrical control unit 10 makes operation permitting section 26 calculate the line segment connecting the present vehicle position 40 and predicted vehicle position 41.

At Step S9, electrical control unit 10 makes operation permitting section 26 determine whether or not the line segment intersects with the imaginary lane boundary line. When the answer to Step S9 is YES, the process proceeds to Step S7. On the other hand, when the answer to Step S9 is NO, electrical control unit 10 returns from this process.

The following describes how the vehicle control apparatus according to the second embodiment operates in different situations.

<Operation on Straight Road> The following describes how the vehicle control apparatus operates when the vehicle is traveling on a straight road with reference to FIG. 9. In the situation (a) in FIG. 9, the lane deviation prevention control is performed because the line segment 54 connecting the predicted vehicle position 41 and present vehicle position 40 intersects with imaginary lane boundary line 42. In the situation (b) or (c) in FIG. 9, the lane deviation prevention control is suspended because the line segment 54 connecting the predicted vehicle position 41 and present vehicle position 40 does not intersect with imaginary lane boundary line 42.

<Operation in Outside Area of Curved Road> The following describes how the vehicle control apparatus operates when the vehicle is traveling in an outside area of a curved road with reference to FIG. 10. In this area, the imaginary lane boundary line 42 is located outside of left lane boundary line 32. When host vehicle 31 is traveling inside of left lane boundary line 32, the line segment 54 connecting the predicted vehicle position 41 and present vehicle position 40 always intersects with imaginary lane boundary line 42. Accordingly, when the predicted vehicle position 41 crosses imaginary lane boundary line 42 and moves to outside of imaginary lane boundary line 42 while host vehicle 31 is traveling in this area, the vehicle control apparatus always performs the lane deviation prevention control.

<Operation in Inside Area of Curved Road> The following describes how the vehicle control apparatus operates when the vehicle is traveling in an inside area of a curved road with reference to FIG. 11. In this area, the imaginary lane boundary line 42 is located inside of right lane boundary line 33. When the vehicle is traveling inside of right lane boundary line 33, a situation (a) is possible where the line segment 54 connecting the predicted vehicle position 41 and present vehicle position 40 intersects with imaginary lane boundary line 42 so that the lane deviation prevention control is suspended. Accordingly, even when the predicted vehicle position 41 crosses imaginary lane boundary line 42 and moves to outside of imaginary lane boundary line 42 while host vehicle 31 is traveling in this area, the vehicle control apparatus selectively performs or suspends the lane deviation prevention control depending on the situation. In the situation (a) in which the angle between imaginary lane boundary line 42 and the direction of travel of host vehicle 31 (deviation angle) is small, the vehicle control apparatus according to the second embodiment suspends the lane deviation prevention control, and thereby prevents the driver from feeling uncomfortable. On the other hand, in the situation (b) in which the deviation angle is large, the vehicle control apparatus performs the lane deviation prevention control, and thereby makes the driver feel safe.

The vehicle control apparatus according to the second embodiment produces at least the following advantageous effect <5> in addition to the effects <1>, <3> and <4> of the first embodiment.

<5> The vehicle control apparatus further comprising a line segment calculating section (26b), wherein: the line segment calculating section (26b) is configured to calculate a line segment connecting the present position (40) and the predicted position (41); and the operation permitting section (26) is configured to perform a process in response to determination that the vehicle (13) is traveling in an imaginary lane defined by the imaginary lane boundary line, wherein the process includes: determining whether or not the line segment intersects with the imaginary lane boundary line; and permitting the lane deviation prevention control in response to determination that the line segment intersects with the imaginary lane boundary line, serves to suppress or prevent the driver from feeling uncomfortable by inhibiting or suppressing the lane deviation prevention control when the line segment fails to intersect with the imaginary lane boundary line so that the deviation angle is small which indicates that the deviating tendency is likely to be in conformance with driver's intention, and serves to make the driver feel safe by permitting and performing the lane deviation prevention control when the line segment intersects with the imaginary lane boundary line so that the deviation angle is large which indicates that the deviating tendency is likely to be in conflict with driver's intention.

The present embodiments may be modified. For example, the configuration that the lane deviation prevention control is inhibited in response to determination that the lane deviation prevention control is unnecessary may be modified so that the manipulated variable M is suppressed or made smaller in response to determination that the lane deviation prevention control is unnecessary than when it is determined that the lane deviation prevention control is necessary.

The entire contents of Japanese Patent Application 2010-063843 filed Mar. 19, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle control apparatus comprising:
   a lane boundary line recognizing section configured to recognize a lane boundary line of a lane in which a vehicle is traveling;
   a present vehicle position recognizing section configured to recognize a present position of a predetermined reference point of the vehicle, wherein the reference point is located within or close to the vehicle;
   a predicted vehicle position calculating section configured to calculate a predicted position of the reference point, wherein the predicted position is a predetermined interval ahead of the present position;
   an imaginary lane boundary line calculating section configured to calculate an imaginary lane boundary line, wherein the imaginary lane boundary line is substantially tangent to the lane boundary line at a point close to the predicted position;
   a lane deviation prevention control section configured to perform a lane deviation prevention control of preventing the vehicle from deviating from the lane by controlling the vehicle depending on positional relationship between the vehicle and the lane boundary line; and
   an operation permitting section configured to selectively permit and suppress the lane deviation prevention control depending on positional relationship among the imaginary lane boundary line, the present position, and the predicted position.

2. The vehicle control apparatus as claimed in claim 1, wherein the operation permitting section is configured to:
   permit the lane deviation prevention control in response to a condition that the predicted position is outside of the imaginary lane boundary line and the present position is inside of the imaginary lane boundary line; and
   suppress the lane deviation prevention control in response to a condition that the predicted position is inside of the imaginary lane boundary line or the present position is outside of the imaginary lane boundary line.

3. The vehicle control apparatus as claimed in claim 1, wherein:
   the present vehicle position recognizing section is further configured to recognize a present position of another predetermined reference point of the vehicle, wherein the reference points are located at left and right sides of the vehicle respectively; and
   the imaginary lane boundary line calculating section is configured to calculate the imaginary lane boundary line for one of the present positions with reference to the lane boundary line closer to the one of the present positions than another lane boundary line of the lane.

4. The vehicle control apparatus as claimed in claim 1, wherein the predicted position is a position predicted to be reached by the reference point after a predetermined period of time.

5. The vehicle control apparatus as claimed in claim 4, wherein:
   the present vehicle position recognizing section is further configured to recognize a present position of a second predetermined reference point of the vehicle, wherein the reference points are located at left and right sides of the vehicle respectively; and
   the predicted vehicle position calculating section is further configured to calculate a predicted position of the second reference point, wherein the predicted position of the second reference point is the predetermined interval ahead of the present position of the second reference point.

6. The vehicle control apparatus as claimed in claim 1, wherein the imaginary lane boundary line calculating section is configured to calculate the imaginary lane boundary line, wherein the point at which the imaginary lane boundary line is substantially tangent to the lane boundary line is a point closest to the predicted position.

7. The vehicle control apparatus as claimed in claim 1, wherein the imaginary lane boundary line calculating section is configured to calculate the imaginary lane boundary line, wherein the imaginary lane boundary line is an imaginary line passing through a pair of points on the lane boundary line, wherein the pair of points are close to the predicted position.

* * * * *